United States Patent
Lang

(10) Patent No.: US 10,028,069 B1
(45) Date of Patent: Jul. 17, 2018

(54) IMMERSIVE AUDIO IN A MEDIA PLAYBACK SYSTEM

(71) Applicant: Sonos, Inc., Santa Barbara, CA (US)

(72) Inventor: Jonathan Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/630,214

(22) Filed: Jun. 22, 2017

(51) Int. Cl.
| | |
|---|---|
| *H04R 5/00* | (2006.01) |
| *H04S 7/00* | (2006.01) |
| *G06F 3/16* | (2006.01) |
| *H04L 29/06* | (2006.01) |
| *H04N 21/436* | (2011.01) |
| *H04N 21/431* | (2011.01) |

(52) U.S. Cl.
CPC ............... *H04S 7/30* (2013.01); *G06F 3/162* (2013.01); *G06F 3/165* (2013.01); *H04L 65/60* (2013.01); *H04N 21/431* (2013.01); *H04N 21/436* (2013.01); *H04N 21/43615* (2013.01); *H04R 2227/005* (2013.01); *H04S 2400/01* (2013.01)

(58) Field of Classification Search
USPC ............ 381/17, 18, 10, 2, 80, 85, 94.7, 300
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |

(Continued)

FOREIGN PATENT DOCUMENTS

| | | | | |
|---|---|---|---|---|
| CA | 2837893 | * | 1/2013 | ............... H04S 3/00 |
| EP | 1389853 A1 | | 2/2004 | |

(Continued)

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.

(Continued)

*Primary Examiner* — Yosef K Laekemariam
(74) *Attorney, Agent, or Firm* — McDonnell Boehnen Hulbert & Berghoff LLP

(57) ABSTRACT

Embodiments described herein involve identifying a primary zone in a network media system for playback of primary audio content, where audio content comprises the primary audio content and auxiliary audio content, and determining respective audio responses of each of one or more auxiliary zones for coordinated playback of the auxiliary audio content with the primary zone. At least one auxiliary zone of the one or more auxiliary zones for coordinated playback of auxiliary audio content may be identified based on the respective audio responses of each of the one or more auxiliary zones. The primary zone can play back the primary audio content, and the at least one auxiliary zone can coordinate playback of the auxiliary audio content with the primary audio content played by the primary zone.

20 Claims, 7 Drawing Sheets

(56) References Cited

U.S. PATENT DOCUMENTS

| | | |
|---|---|---|
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0038999 A1* | 2/2007 | Millington ............ H04J 3/0664 718/100 |
| 2007/0142944 A1 | 6/2007 | Goldberg et al. |

FOREIGN PATENT DOCUMENTS

| | | |
|---|---|---|
| WO | 200153994 | 7/2001 |
| WO | 2003093950 A2 | 11/2003 |

OTHER PUBLICATIONS

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

Select zone(s) for in-room audio:
- ● Living Room
- ○ Balcony
- ○ Dining Room
- ○ Kitchen
- ○ Bathroom
- ○ Office
- ○ Master Bedroom
- ○ Bedroom

NEXT

FIGURE 6A

Select zone(s) for auxiliary audio for Living Room:
- ● Balcony
- ● Dining Room
- ● Kitchen
- ● Bathroom
- ● Office
- ● Master Bedroom
- ○ Bedroom

NEXT

FIGURE 6B

Select a first zone for auxiliary audio calibration:
- ● Balcony
- ○ Dining Room
- ○ Kitchen
- ○ Bathroom
- ○ Office
- ○ Master Bedroom

NEXT

FIGURE 6C

IMMERSIVE AUDIO IN A MEDIA PLAYBACK SYSTEM

CROSS REFERENCE TO RELATED APPLICATIONS

This application incorporates by reference the entire contents of (i) U.S. patent application Ser. No. 15/009,319 filed Jan. 28, 2016 and titled "Audio Processing"; (ii) U.S. patent application Ser. No. 14/731,119, filed on Jun. 4, 2015, and titled "Dynamic Bonding of Playback Devices," which published as U.S. Patent Application Publication No. 2016/0357503 on Dec. 8, 2016; (iii) U.S. patent application Ser. No. 11/853,790 filed on Sep. 11, 2007, titled "CONTROLLING AND MANIPULATING GROUPINGS IN A MULTI-ZONE MEDIA SYSTEM" and granted as U.S. Pat. No. 8,483,853 on Jul. 9, 2013; and (iv) U.S. patent application Ser. No. 14/737,199, filed on Jun. 11, 2015, titled "MULTIPLE GROUPINGS IN A PLAYBACK SYSTEM", and published as U.S. Patent Application Publication No. 2016/0364206 on Dec. 15, 2016.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 6A, 6B, and 6C show example interfaces for a method for providing immersive audio according to aspects described herein;

Figure 1:
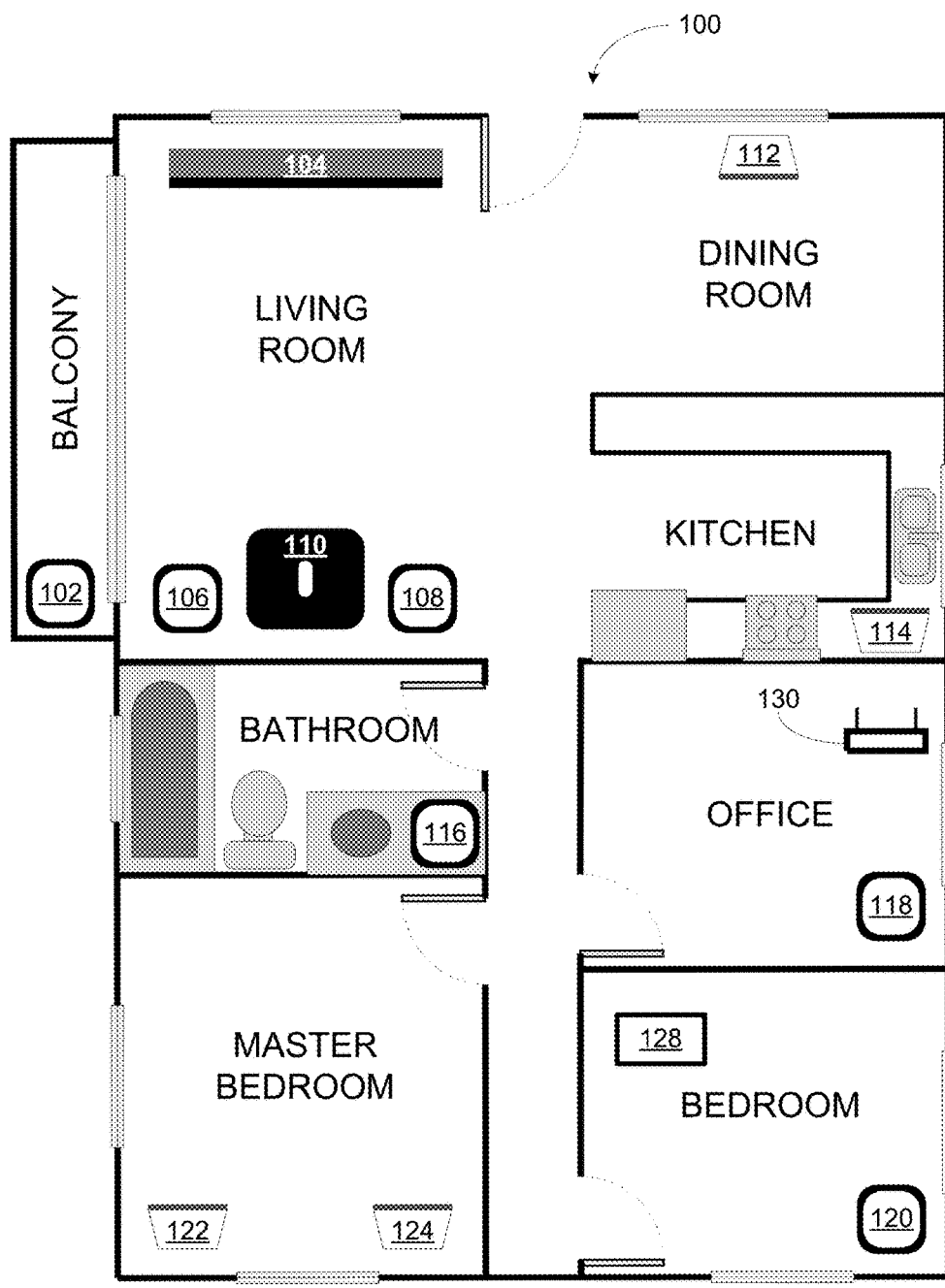
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In a multi-zone media playback system, playback devices may be spatially distributed throughout an environment (e.g., home environment, office environment, retail environment, etc.). Spatially distributed playback devices may be used to provide a listener in a particular location within the environment with a uniquely immersive audio experience by, for example, allowing the user to experience spatially distant sounds or audio in audio content being played by spatially distant playback devices within the listening environment. Some embodiments described herein involve providing such an immersive audio experience.

As indicated above, some examples provided herein involve coordinating playback of audio between zones, so as to provide an immersive audio experience. For example, in a home environment, a living room zone may be a primary zone where a listener may be located while consuming audiovisual content. Other zones spatially distributed in the home environment may be used as auxiliary zones to play back audio to provide additional audio and/or effects for the listener in the living room zone. As an example, the audio-visual content may call for a distant explosion behind the listener. Playback devices in a zone in the home environment located behind the listener can be used to play the explosion allowing the listener to hear an explosion originating from a location spatially distant from the listener.

In one aspect, a method is provided. The method involves identifying a primary zone in a network media system for playback of primary audio content, where audio content comprises the primary audio content and auxiliary audio content, and determining respective audio responses of each of one or more auxiliary zones for coordinated playback of the auxiliary audio content with the primary zone. At least one auxiliary zone of the one or more auxiliary zones for coordinated playback of auxiliary audio content may be identified based on the respective audio responses of each of the one or more auxiliary zones. The primary zone can play back the primary audio content, and the at least one auxiliary zone can coordinate playback of the auxiliary audio content with the primary audio content played by the primary zone.

In another aspect, a device is provided. The device includes at least one processor, and memory having stored thereon instructions executable by the at least one processor to cause the device to perform functions. The functions include identifying a primary zone in a network media system for playback of primary audio content, where audio content comprises the primary audio content and auxiliary audio content, and determining respective audio responses of each of one or more auxiliary zones for coordinated playback of the auxiliary audio content with the primary zone. At least one auxiliary zone of the one or more auxiliary zones for coordinated playback of auxiliary audio content may be identified based on the respective audio responses of each of the one or more auxiliary zones. The primary zone can play back the primary audio content, and the at least one auxiliary zone can coordinate playback of the auxiliary audio content with the primary audio content played by the primary zone.

In yet another aspect, a non-transitory computer readable memory is provided. The non-transitory computer readable memory has stored thereon instructions executable by a computing device to cause the computing device to perform functions. The functions include identifying a primary zone in a network media system for playback of primary audio content, where audio content comprises the primary audio content and auxiliary audio content, and determining respective audio responses of each of one or more auxiliary zones for coordinated playback of the auxiliary audio content with the primary zone. At least one auxiliary zone of the one or more auxiliary zones for coordinated playback of auxiliary audio content may be identified based on the respective audio responses of each of the one or more auxiliary zones. The primary zone can play back the primary audio content, and the at least one auxiliary zone can coordinate playback of the auxiliary audio content with the primary audio content played by the primary zone.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
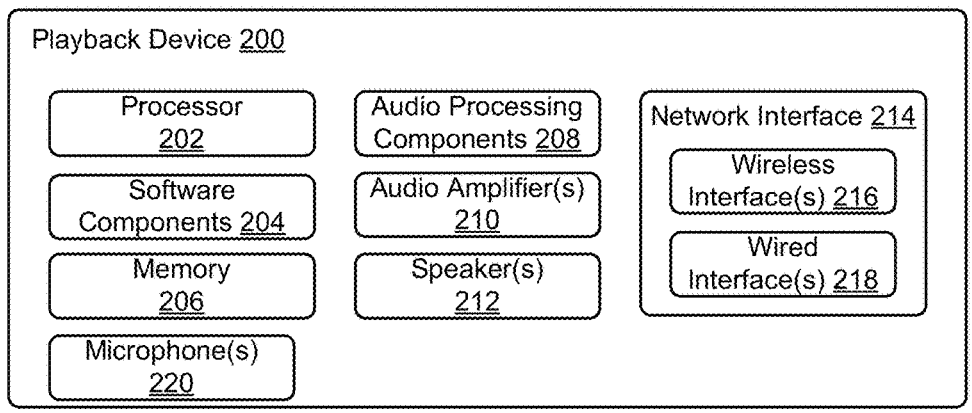
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audiovisual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device. In the dining room, playback devices 109, 111, and 112 may be configured to play audio content in synchrony as individual playback devices, as one or more bonded playback devices, as one or more consolidated playback devices, or any combination thereof.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
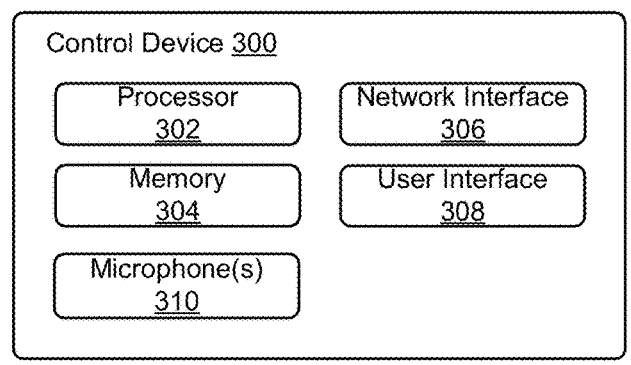
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, an user interface 308, and microphone(s) 310. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
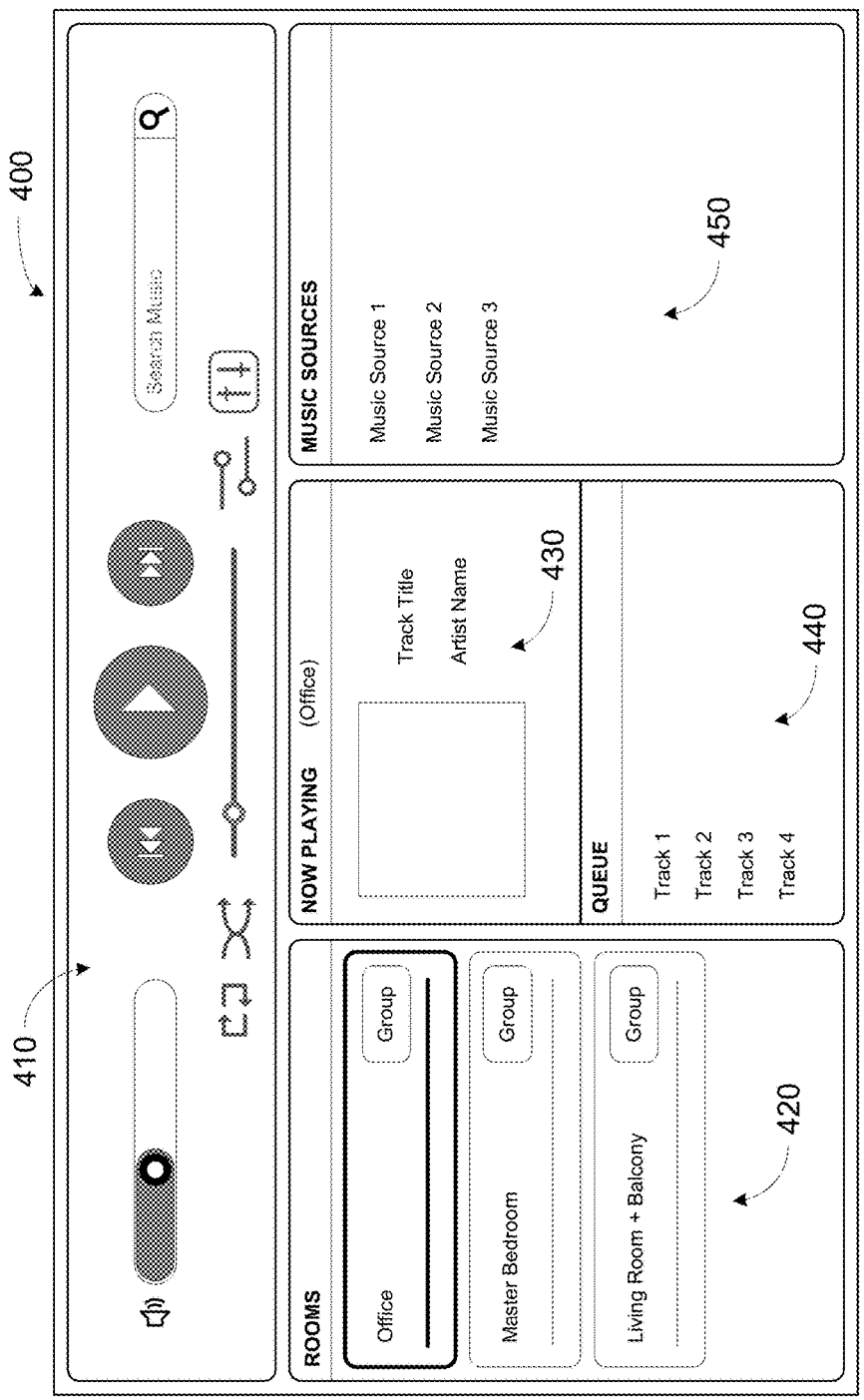
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone.

Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Immersive Audio Embodiments

As discussed above, embodiments described herein may involve coordinating playback of audio between zones or playback devices such that a listener at a listener location can hear spatially distant audio in audio content being played by spatially distant playback devices. The immersive audio experience may be implemented with a media playback system according to aspects described herein. The media playback system may include one or more zones, and one or more zones can be used to provide an immersive audio experience based on spatial locations of the playback devices of the one or more zones.

Figure 5:
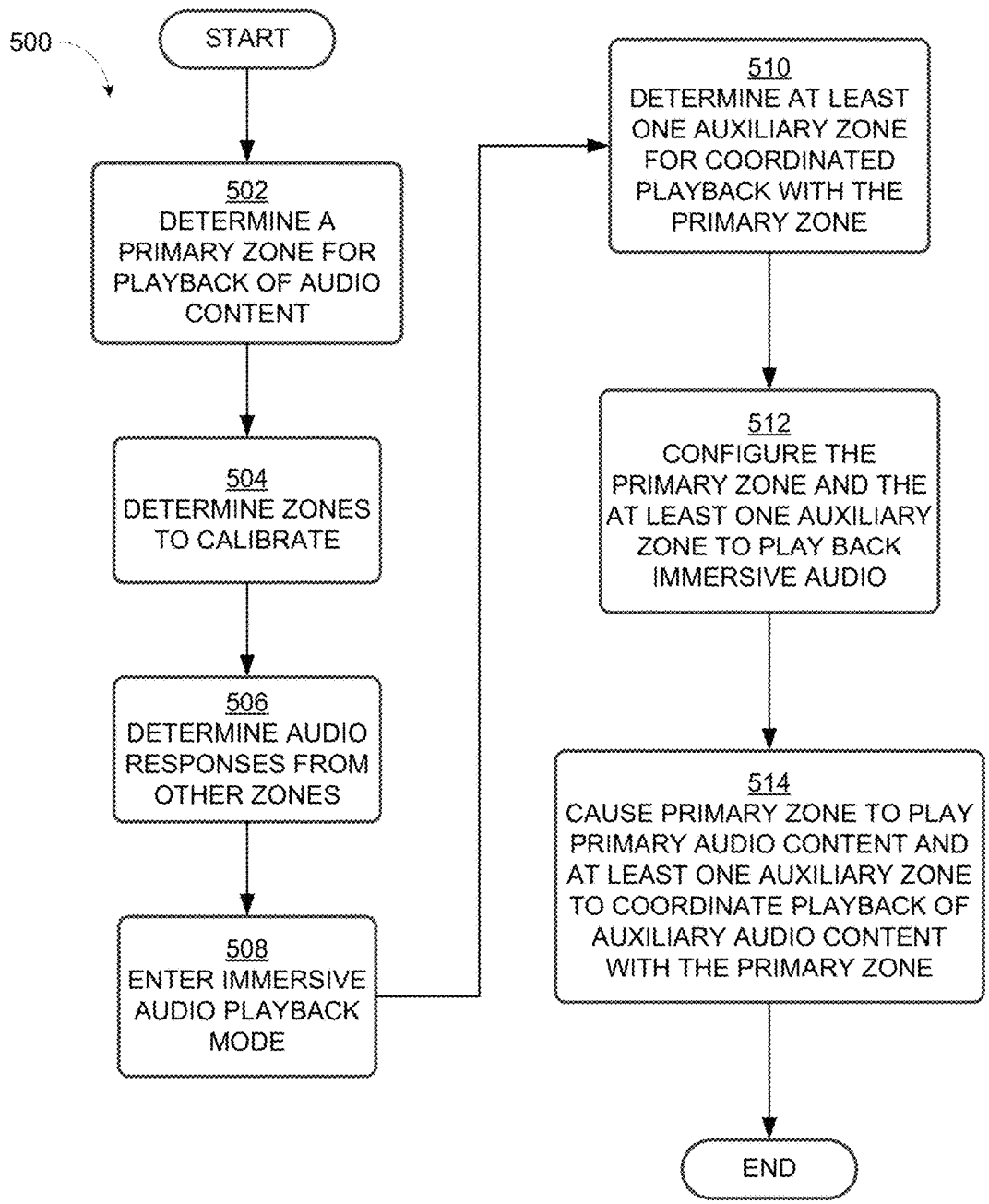
FIG. 5 shows an example flow diagram for a method for providing immersive audio according to aspects described herein.

Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-516. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, one or more primary zones for playback of primary audio content may be determined. Primary zones may be zones in the media playback system that are assigned to play back the primary audio content of immersive audio content from an audio content source. Immersive audio can include one or more of audio components (e.g., primary audio, auxiliary audio) which can be mapped or assigned for playback by different spatially distinct playback devices based on, for example, their spatial relationships and/or orientation (e.g., direction, relative position, and/or relative distance) to a listener location.

Primary audio content may be "in-room" audio content such as one or more audio components specified for playback in a zone that contains the listener location or in a zone near a listener location. Primary audio, for example, may be audio which contains dialogue and/or music corresponding to video being presented on a display of a device (e.g., television, monitor, computing device, mobile device, etc.). Auxiliary audio may be audio designated for playback in zones other than a primary zone such as a non-listener zone (e.g., zones which do not contain a listener location or not near a listener location) and may contain audio primarily for audio effects (e.g., surround effects, explosions, etc.).

In some cases, the one or more audio components may be received in the form of multi-channel audio. Primary audio content may be in one or more channels and can include some or all of the channels designated for a particular set of speakers in a configuration. For example, primary audio content may include front channel audio components which may be mapped to front speakers in a multi-channel surround sound system (e.g., 3.1 channel surround sound system, 5.1 channel surround sound system, 7.1 channel surround sound system, etc.). As yet another example, primary audio content may include all audio components in a multi-channel surround sound system. Primary audio content can include audio components and information indicating that the audio components be mapped to particular playback device locations (e.g., front playback devices, rear playback devices, side playback devices, ceiling playback devices, floor playback devices), to playback devices having a particular audio or orientation characteristic (e.g., frequency response range (e.g., subwoofer)), and/or to playback devices having a particular transducer position (e.g., angle, height)). In some instances, auxiliary audio may be located in one or more additional or auxiliary channels which are provided in addition to channels containing the primary audio content.

The auxiliary audio may be provided in the same audio stream or file as the primary audio or in a different audio stream or file. For example, the primary audio content may be provided from a first source (e.g., local source, network source, remote source) and the auxiliary audio content may be provided from a second source (e.g., local source, network source, remote source) which could be the same or different as the first source. An audio source may be a computing device, computer-readable medium, server, or playback device which can transmit the audio content over a wired or wireless connection to the media playback system.

In some instances, the media playback system may process received audio content to map the audio content to particular speakers in the media playback system. For example, the media playback system may receive audio which was not produced or mixed for immersive audio (e.g., mono audio, stereo audio, etc.), and the media playback system can process the received audio to generate one or more channel streams which can be mapped to particular playback devices. The processing may be performed on any computing device in the media playback system such as a playback device, a control device, and/or a server. In some instances, the same auxiliary audio data stream may be played by more than one auxiliary zone. In yet other cases, the audio content may be provided in the form of object-based audio with metadata which are processed by the media playback system to produce audio specifically for the configuration and/or spatial distribution of devices in the system such that the audio content customized to which devices are in the media playback system. The processing device (e.g., playback device, computing device, server) may process the audio objects to generate audio streams that map to one or more playback devices in the media playback system based on physical playback device placement and orientation in a zone and/or based on audio responses captured as will be described with respect to block 504.

Other examples of a processing device processing received audio content to map the audio content to particular speakers in the media playback system can be found in U.S. patent application Ser. No. 15/009,319, filed Jan. 28, 2016, and titled "Audio Processing," which is hereby incorporated by reference in its entirety.

In block 502, the media playback system may identify one or more zones that can be a primary zone. Primary zones may be, for example, zones which contain home theater type playback devices and/or non-home theater type playback devices. Home theater type devices (e.g., sound bar, sound base) may be identified as playback devices which can receive and/or playback immersive audio. For example, home theater devices may be playback devices which are typically provided with audio associated with multimedia content (e.g., music, movie, television, video game, and/or other audiovisual or audio content). During initial setup of playback devices, the types of playback devices present in the media playback system may be identified, and those playback devices identified as generally outputting audio from audiovisual content may be identified as being available for use as a primary zone in an immersive audio playback configuration. Home theater type playback devices may be identified based on a name, model number, serial number of the playback device and/or capabilities of the playback device (e.g., available interfaces (e.g., optical, HDMI, etc.)).

In some aspects, more than one zone may be grouped together to form a primary zone to play back audio synchronously with at least one other zone. For example, two zones may be located in the same open area such as a kitchen and living room that are not separated by a wall or other physical barrier, and the grouped "kitchen+living room" zone may operate as a single primary zone. As yet another example, in some instances, more than one zone may occupy the same space and be grouped to form a single primary zone.

In some cases, a user may identify during initial setup of the media playback system or during a setup process for immersive audio which devices or zones may be primary devices or zones for immersive audio, and default or preferred primary zones may be selected during the setup phase.

FIG. 6A shows an example user interface via which a computing device may receive a selection by a user of one or more zones for in-room audio. The selected zones for in-room audio may be designated as default primary zones and may be automatically identified as the primary zone when immersive audio playback is initiated.

In one example, the home theater zone or television zone may default to being a primary zone for immersive audio based on the type of zone indicated by the name. The playback device(s) in the home theater zone or television zone or any primary zone may be configured to receive audio from an audiovisual source (e.g., television, set-top box, video game console, media player (e.g., Apple TV, Roku, Amazon Fire, Google Chromecast Video), mobile device, virtual reality (VR) device, augmented reality (AR) device), computing device). The playback device may receive the audio via a wired or wireless interface from the source. In some cases, the playback device may be provided with an identifier (e.g., URI, URL) of the media content (e.g., audio and/or video content), and the playback device can obtain a stream of the media content using the identifier.

In some instances, more than one zone in the media playback system may be suitable to be a primary zone. In the event more than one zone could be a primary zone, the user may choose to separately calibrate each primary zone for immersive audio playback according to aspects that are described with respect to blocks 504-506. For example, if a living room zone and a theater zone could both be primary zones, the immersive audio calibration and setup process may be first performed with the living room zone as the primary zone and then repeated with the theater zone as the primary zone.

In yet another example, the computing device may automatically detect the zone in which the computing device is located and cause that zone to be a primary zone based on, for example, wireless signal strength, proximity detector, visual sensor (e.g., camera) and/or other sensor. For example, the computing device can determine which playback device has the strongest wireless signal (e.g., RSSI), and/or the playback devices can determine which playback device detects the wireless signal of the computing device the strongest. As another example, the playback device and/or the computing device may have a proximity detector which can detect another device or object within a particular distance range.

At block 504, method 500 includes determining which zone(s) in the media playback system are candidates for calibration as auxiliary zone(s) to be performed in block 506. One or more zones may be identified as auxiliary zone candidates. The user and/or the media playback system can determine for which zone(s) to disable auxiliary zone mode such that the zone(s) is not used or calibrated for use as an auxiliary zone. Some zones might not be desirable as auxiliary zones due to their distance or relative position from the listener location or due to their zone type. As part of the process in block 504, an initial determination may be made on whether to disable the auxiliary zone mode in some zone(s) such that these zones are not calibrated for auxiliary zone use in the calibration process described in block 506. An indication that a zone is disabled for use as an auxiliary zone may be stored in a memory of one or more playback devices in the zone such as in a state table or as a flag. The initial determination may be done manually by the user and/or automatically by the media playback system. In some aspects, the initial determination may be performed as part of block 506 using the same or different audio used in block 506.

The user may manually select which zone(s) has its auxiliary zone mode disabled. For example, the media playback system may display on an interface a list of all available zones in the media playback system and enable the user to select one or more zones where the auxiliary zone mode is to be disabled. For those zones where the auxiliary zone mode is disabled, the zones would not be available for setup or use in immersive audio. In response to receiving a selection to disable the auxiliary zone mode, the control device can send a message to the selected zone with instructions to disable the auxiliary zone mode.

In some aspects, an option may be provided in the interface where the user can later select a zone that has auxiliary zone mode disabled and enable the zone for use as an auxiliary zone. In response to auxiliary zone mode being enabled, the playback device may receive an instruction to enable the auxiliary zone mode, and the media playback system may begin the immersive audio calibration process in blocks 504-506. In some aspects, the media playback system may provide a prompt to the user to enable the user to select whether to perform the calibration process to include the new zone. If the newly-enabled zone will be used as an auxiliary zone, the calibration process may be performed only on the newly-enabled zone. If the newly-enabled zone will be used as a primary zone, the entire calibration process described in blocks 504-506 may be performed.

The media playback system can automatically remove certain zone(s) from being available as an auxiliary zone. For example, a device (e.g., computing device, control device, playback device, network device) of the media playback system can determine that a particular zone is too distant from a primary zone to be used as an auxiliary zone. A determination of distance may be performed based on a measurement of radio frequency signal strength between one or more playback devices in the primary zone and one or more playback devices in another zone. For example, the signal strength may be a received signal strength indicator (RSSI) measurement of a wireless communication signal strength between antennas of different playback devices and/or wireless communication signal strength between antennas of different playback devices and an intermediate device (e.g., computing device, network router).

As another example, the media playback system may decide to remove a zone from being available as an auxiliary zone candidate based on audio being played by a playback device. For example, a microphone device containing at least one microphone (e.g., computing device, playback device, control device) may located in a primary zone and audio (e.g., tone, music) can be played by one or more playback devices in an auxiliary zone candidate. While the microphone device is located in the primary zone, the microphone device can start capturing audio when the auxiliary zone is playing audio. Based on characteristics of the captured audio, the media playback system can automatically determine whether to eliminate a zone from consideration or use as an auxiliary zone. For example, the audio played auxiliary zone candidate may be played at a predetermined volume (e.g., volume level, decibel) and frequency or frequency range(s), and the microphone may capture the audio being played by the auxiliary zone candidate at particular volume (e.g., decibel). If the volume is below a certain threshold, then the media playback system may remove the zone from consideration as an auxiliary zone by disabling the auxiliary zone mode. In some aspects, if the volume of a particular frequency range is below a threshold, then the auxiliary zone mode may be disabled. For example, particular devices may be used in immersive audio playback primarily for a certain frequency range (e.g., high-frequency, low-frequency) even though the devices are full-frequency playback devices.

In yet another example, the media playback system may decide to remove a zone from being available as an auxiliary zone candidate based on the name of the zone. It may be undesirable for certain types of zones to be used as an auxiliary room such as zones located in an outdoor area, bedroom, baby's room, and basement. For instance, zone names which may typically be associated with an outdoor area such as "patio," "balcony," "yard," "backyard," "deck," "porch," etc. may be automatically removed from use as an auxiliary zone. Other zone characteristics that may be used as a basis for automatic removal from use as an auxiliary zone are possible.

At block 506, auxiliary zone candidates may be calibrated for use as an auxiliary zone during immersive audio playback by capturing audio responses of auxiliary zones in the media playback system. The audio responses may be measurements of characteristics (e.g., volume, magnitude, phase, frequency response) of calibration audio played by a playback device as captured and measured by a microphone device. In identifying candidate zones that can be used as auxiliary zones to support immersive audio or categorizing zones in the media playback system for use as auxiliary zones, a microphone may be used to measure responses of audio played by other zones while the microphone device is located within the primary zone. The microphone may be any device containing a microphone such as, but not limited to, a computing device, network microphone device, playback device, or control device 300. The microphone may be placed at or near a listener location in a primary zone, and while the microphone is at the listener location, the microphone may be used to capture and/or record calibration audio being played by other zones in the media playback system.

This calibration process of obtaining the audio response may be repeated. For example, one playback device at a time may play back the calibration audio with the microphone device recording the calibration audio being played back. The process may be repeated until every playback device in the media playback system has played the calibration audio and had its response recorded. In some aspects, the audio response process may be performed with a subset of playback devices such as those playback devices which are in a neighboring zone (e.g., a zone adjacent to a primary zone) may be identified for audio response measurement. The calibration audio playback and measurement of the audio response process may be repeated individually for each device in the media playback system.

In some aspects, a user may select which zone(s) of the media playback system to calibrate for use as auxiliary zones. For example, FIG. 6B shows an example user interface where a computing device may display an interface for the user to select zone(s) which can be used for auxiliary audio. The selected zones may be identified as candidate auxiliary zones which are calibrated for immersive audio during an immersive audio calibration process.

In some cases, the user can select which zones to perform calibration on. FIG. 6C shows an example interface where the user can select which zone to perform calibration on. Once the calibration process is completed on the selected zone, the display may show an interface listing the remaining zones for calibration, and the user can select the next zone for calibration. In some aspects, the system can automatically cycle through each of the zones for calibration after the user has selected the zone that the calibration process is to start with.

The device may transmit a command to one or more playback devices in the zone being calibrated to start playback of the audio, or the playback device can send a message to the microphone device to begin capturing calibration audio.

Calibration

Figure 7:
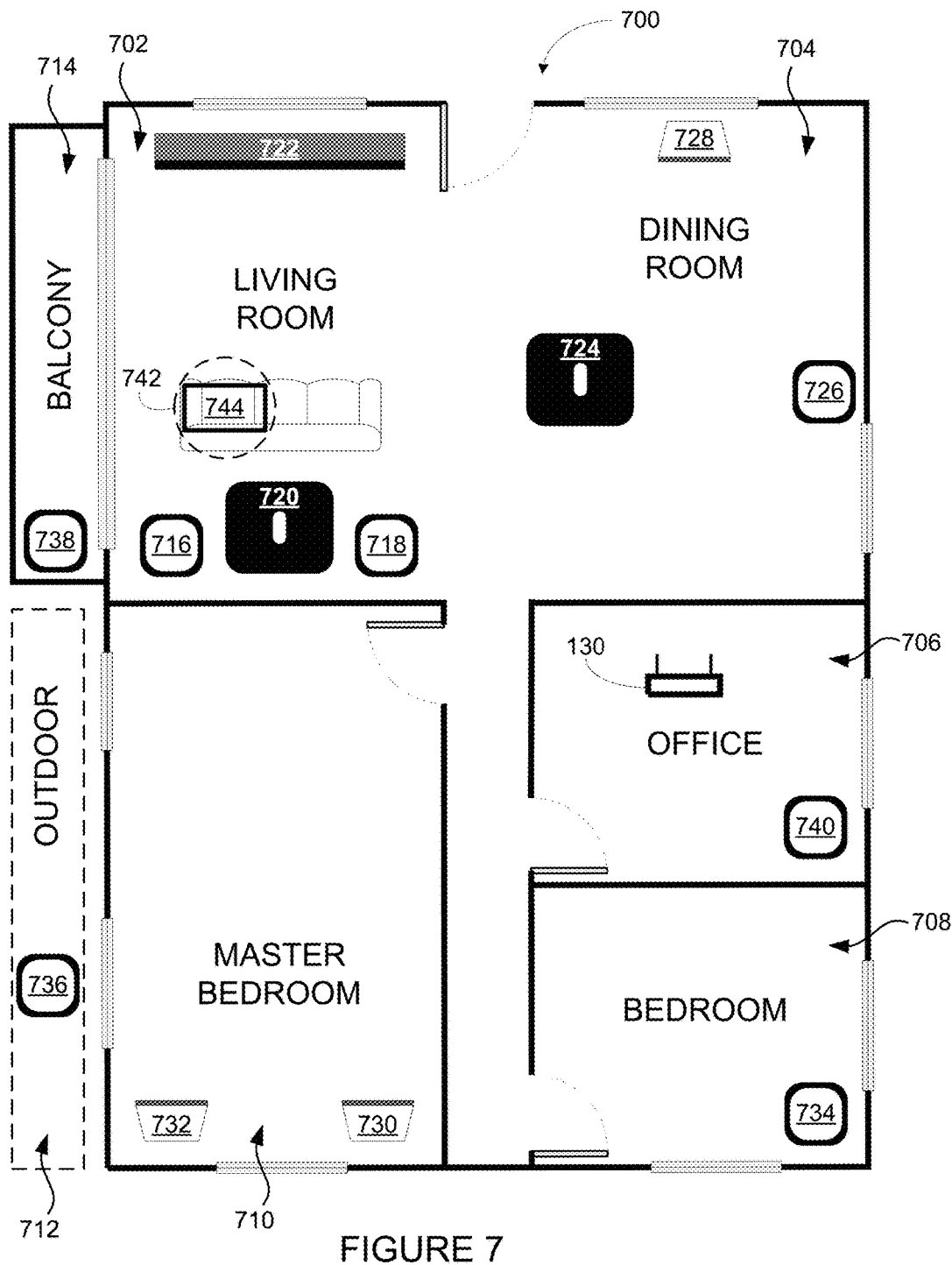
FIG. 7 shows an example media playback system configuration in which certain embodiments may be practiced.
Figure 8:
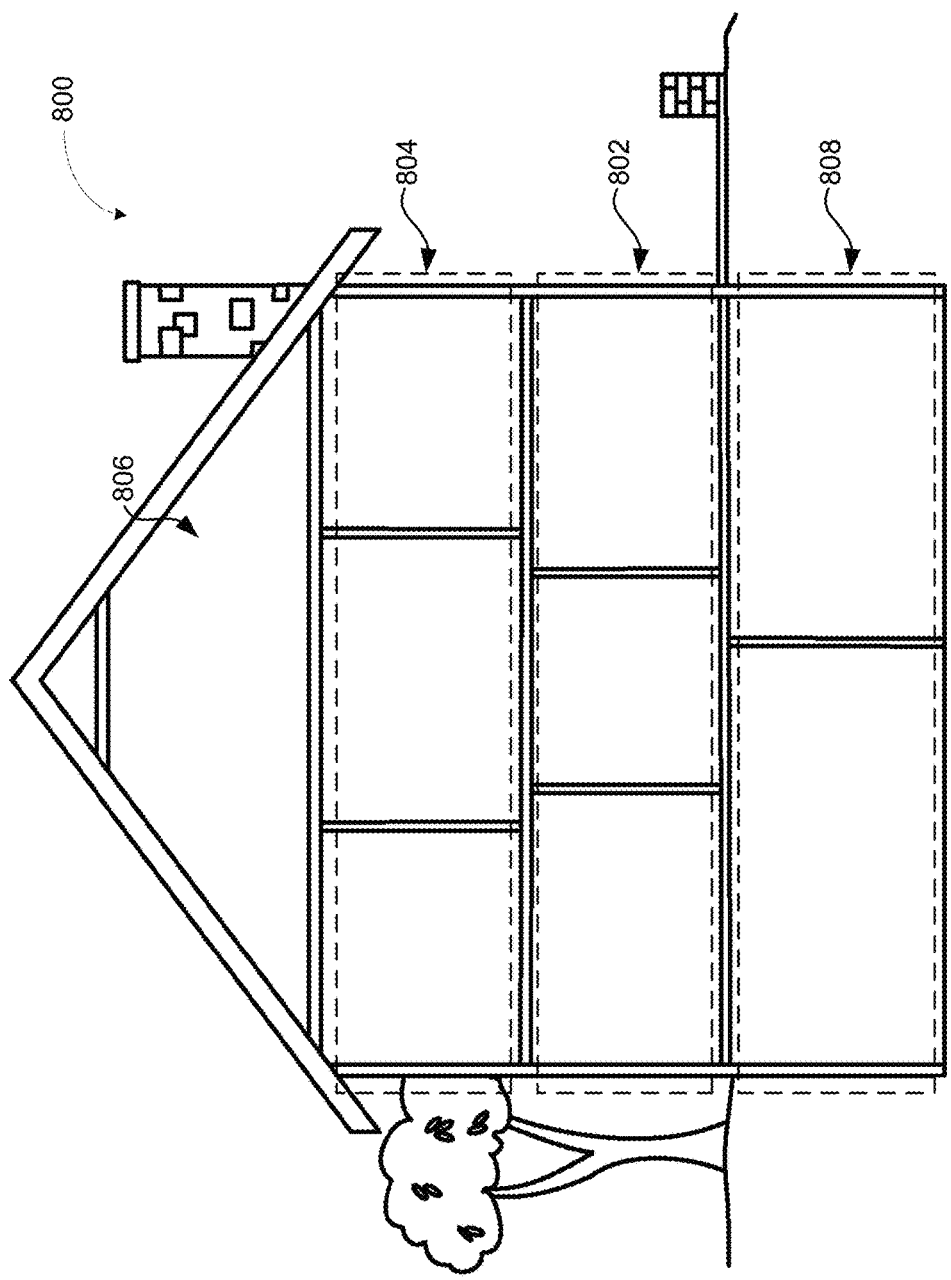
FIG. 8 shows an example media playback system configuration in which certain embodiments may be practiced.

An example of calibration performed for immersive audio will be explained using the environment shown in FIGS. 7 and 8 as an example. FIG. 7 depicts an example environment containing a media playback system 700 in which aspects of method 500 may be performed. FIG. 7 shows a top view of one floor of an example environment, and FIG. 8 shows a side view of a building with multiple floors such as a first floor 802, a second floor 804, a third floor 806, and a basement 808. One or more of the floors may contain one or more zones such as the floor shown in FIG. 7.

Media playback system 700 can include playback devices 716-740, a control device 744, and a wired or wireless network router 130. Playback devices 716-740 may be playback device 200, and control device 744 may be a control device 300. Illustrative zones for media playback system 700 may include zones 702-714. For example, a first zone 702 may be a "living room" zone including playback devices 716-722 and a listener location 742 where a control device 744 may be located. A second zone 704 neighboring or adjacent to (e.g., spatially adjacent) may be a "dining room" zone including playback devices 724-728. A third zone 706 may be an "office" zone including playback device 740, and a fourth zone 708 may be a "bedroom" zone including playback device 734. A fifth zone 710 located adjacent to the first zone 702 may be a "master bedroom" containing playback devices 730-732. A sixth zone 712 may be a zone located outside of a building. Sixth zone 712 may be identified as an "outdoor" zone and include playback device 736. A seventh zone 714 including playback device 738 may be named "balcony" zone. Playback devices 716-740 may be playback device 200, and control device 744 may be control device 300.

As a first example, the first zone 702 may be identified as an option for a primary zone as described with respect to block 502. As an example, auxiliary zone mode may have been disabled for playback device 736 in outdoor zone 712 and playback device 738 in balcony zone 714 in block 504. Control device 744 may be the microphone device capturing and recording the audio responses. In measuring responses of zones being calibrated relative to the living room zone, control device 300 may be located in the living room zone and can be located in or near a listener location 742 within the living room zone. To measure the audio response of, for example, the dining room zone relative to the living room zone, the media playback system (e.g., playback device, control device, networked microphone device) may transmit a message including an instruction to one or more of the playback devices (e.g., playback device 109, playback device 111, and/or playback device 112) to play calibration audio.

The calibration audio may be played at a first volume level and changed gradually (e.g., volume level increments) to being played at a second volume level while the calibration audio is being captured by the microphone device. For example, the first volume level may be a default starting volume level or the current volume level of the playback device, and the second volume level may be a maximum volume level for audio playback by the playback device while in auxiliary zone mode. The volume level for the calibration audio may be gradually increased until the microphone device in the listener location can detect the calibration audio being played by the playback device in a candidate auxiliary zone. In order to be included as an auxiliary zone, the microphone device may need to be able to detect the calibration audio at a minimum threshold volume (e.g., decibel level) while located in the primary zone 702 or listener location 744.

The maximum volume level for auxiliary audio may be set by a user or automatically by the media playback system. The listener may manually set the maximum auxiliary volume level for each zone. For example, while playing back the calibration audio the user may adjust the volume level to a desired maximum volume level. This can be performed during or before the calibration process is performed. For example, the user may initiate the calibration process using control device 744 and leave control device 744 in listener location 742. The user may then adjust the volume in the zone being calibrated to a desired maximum volume level while in the zone and indicate that the desired maximum volume level has been set. The indication may be input on the control device 744 or through an interface (e.g., button, capacitive touch input, gesture) on the playback device.

If the microphone device does not detect the calibration audio at at least the minimum threshold volume while playback of the calibration audio is at the maximum volume level, playback of the calibration audio may be stopped, and the zone being calibrated may be removed from inclusion as an auxiliary zone (e.g., disable auxiliary zone mode for the zone). The minimum threshold volume level may be set by the media playback system and/or may be dependent on the immersive audio content being played back. In some aspects, the minimum threshold volume level may be specified by a user. A particular piece of immersive audio content may specify the minimum threshold volume level so that, for example, listeners can hear all or a portion of the auxiliary audio. The minimum threshold volume level may be transmitted prior to or with the immersive audio content.

Calibration of the next zone being considered as an auxiliary zone may be initiated automatically or in response to user input. For example, auxiliary zone calibration may be performed for second zone 704, and once calibration in second zone 704 is completed, calibration may continue to third zone 706. Calibration for zones 708 and 710 may be performed, and the calibration process may be completed after zones 706-710 have been completed since the auxiliary zone mode may have been disabled, for example, in zones 712 and 714.

The calibration audio may be predetermined audio (e.g., tone, music, dialogue) with particular characteristics (e.g., audio level range, frequency range) to estimate or capture how audio content would be experienced at a listener location. The calibration audio may be stored in a device of the media playback system and/or the message can include an identifier indicating a location where the calibration audio can be obtained by the playback device. In some aspects, the calibration audio may be streamed from the microphone device to the playback device. While in or near the living room zone, a device such as control device 744 can measure the audio response characteristics of the audio played by the one or more playback devices in the dining room zone using microphone(s) 310. Control device 744 can record audio as captured by microphones and/or measure magnitude and/or phase of the audio being played as received by the control device microphone. In some cases, the user may be instructed to move the microphone device in a certain manner to capture the calibration audio at different spatial locations.

As another example, a user may be instructed to hold or wear a microphone device (e.g., control device 744) and to stand or sit in a listener position or listener location where the user would typically be when consuming or viewing content in the particular primary zone. For example, a listener sitting on the sofa in the first zone 702 may be in a listener location 742. The user may further be instructed to position the microphone device in a certain orientation, (e.g., horizontal, vertical, perpendicular, microphone pointing upwards) and/or at a certain height (e.g., eye level of the user, shoulder level, predetermined distance above the ground). For example, the user may hold the microphone device while sitting on a couch in the home theater zone, or the user may place the microphone device on the couch in the home theater zone. While the microphone device is at the listener location 742, playback devices in selected zones or all zones may play audio (e.g., predetermined audio, tone, etc.) while the microphone device captures audio characteristics of the audio played by each playback device.

The audio response may be stored in the media playback system remotely and/or locally. For example, the audio response for each zone or playback device may be stored in at least one playback device, control device 744, network storage (e.g., network attached storage), and/or in a computing system (e.g., server) which is accessible by any devices of the media playback system over one or more networks (e.g., internet, wide area network, local area network). For example, an audio response may be stored for each zone and/or each playback device and/or each bonded zone. The microphone device capturing the audio response may transmit over a network the recorded audio response for storage.

Each audio response may be used in determining a location category or other identifying label for the corresponding zone(s) or playback device(s) which can correspond to audio components in the audio content. As an example, in the home environment shown in FIG. 7, the microphone device used in measuring the audio responses may be located in the living room zone 702, and the device may determine based on audio played by the playback device(s) of the dining room zone 704 that the dining room zone 704 is the room to the right of the living room zone. Similarly, the device may determine that the master bedroom zone 710 is located behind the living room zone 702. The location labels may be used in mapping audio content to different spatially distinct zones. Directionality may be determined based on orientation directions provided during the calibration process. For example, the listener may be instructed to hold the microphone device with the screen facing the user and the microphone pointed upward while located at the listener location and facing a display device (e.g., screen, display, television, monitor).

In some aspects, the media playback system may prompt the user to assign a location category for one or more of the zones. A user interface 308 may be displayed on control device 300, and the user interface 308 can enable the user to select one or more zones in the media playback system and assign a category label to the zone via a plurality of predetermined category options and/or via free form text input. For example, the user can select the dining room zone and the office zone in environment 700 and associate those zones with, for instance, a "right zone" tag or label assuming a listener would be facing playback device 104 when listening to audio content and/or watching audiovisual content. Similarly, the balcony zone may be associated with a "left zone" label.

In some aspects, the primary zone may be selected based on the type of audio content being provided to the media playback system and/or the source of the audio content. For example, if the audio content has more than one channel, a zone containing bonded zone devices (e.g., stereo pairs, surround sound configuration) may be selected as the primary zone. As another example, the source of the audio content may be a display device (e.g., television) or other device (e.g., set-top box, media player, etc.) which is located in the living room. When the media playback system detects that the source of the audio is a particular device located in the living room zone, the media playback system may automatically designate or identify the living room zone as the primary zone. For example, the playback device can determine the source of the audio content based on the device or interface (e.g., line-in part, wired communication) from which the playback device receives the audio content.

In some aspects, the audio responses may be used to adjust equalization settings to customize playback to the listener location or listener area 744 and playback environment which may be implemented as described in application Ser. No. 15/005,853 filed on Jun. 25, 2016 and titled "Calibration with Particular Locations," which is hereby incorporated by reference in its entirety.

If another zone can be used as a primary zone, the calibration process described herein may be repeated with a second zone set as the primary zone.

At block 508, one or more zones of the media playback system may enter an immersive audio mode. The immersive audio mode may be started in response to one or more immersive audio playback events such as a user selecting a primary zone for audio playback, the media playback system receiving immersive audio data, and/or individual zones receiving immersive audio data. For example, individual zones receiving immersive audio data may involve the primary zone receiving audio data identified specifically for playback in the primary zone and/or auxiliary zone(s) receiving audio data identified specifically for playback in an auxiliary zone.

Starting the immersive audio mode in response to the media playback system receiving immersive audio data may involve the media playback system receiving a datastream containing audio content. The audio content may be received in response to playback being initiated at or by another device. For example, a media player may initiate playback of audiovisual content and transmit the audio portion of the audiovisual content to the media playback system. The media playback system may process the received audiovisual content for tags or other markers indicating the type or format of the received audio content. The audio content may be received by a playback device in a particular zone and that zone may be selected as the primary zone. Based, for example, on the tags, a device of the media playback system (e.g., playback device, controller, server) can determine at least one auxiliary zone to select for coordinated playback to produce an immersive audio experience for the listener. Immersive audio may be identified in an audio datastream or file via, for example, tags, particular codecs, flags, channel mapping data, channel masks, metadata, and/or other identifiers.

At block 510, at least one additional zone may be selected as an auxiliary zone for coordinated audio playback with the primary zone. The selection of the at least one additional zone may be based on the content being played. An auxiliary zone may include any calibrated zone which is not being used as a primary zone (e.g., any non-listener location zone).

The auxiliary zone(s) may be selected based on audio responses captured and/or categories assigned in block 504. For example, the immersive audio content may include a first audio component for a "right zone" and a second audio component for a "left zone." The media playback system may determine that the dining room zone is associated with a "right zone" tag when the primary zone is the living room zone and assign the dining room zone to play the first audio component. Similarly, the media playback system may determine that the balcony zone is associated with a "left zone" tag when the primary zone is the living room zone and assign the balcony zone to play the second audio component.

In another example, the immersive audio content may include a first audio component for a "downstairs zone" and a second audio component for an "outside zone." In some aspects, similar relative zones may be interchangeable. For example, where a "basement zone" and a "downstairs zone" may be the same, the first audio component may be played by a "basement zone." Using the example environment of FIG. 8, where the primary zone is on first floor 802, basement 808 may correspond to both the "downstairs zone" and the "basement zone."

Playback devices or zones which receive audio for audio-visual content may be automatically used or identified as a primary zone. In some instances, an immersive audio group setting or mode may be predetermined. The immersive audio group setting or mode may include a particular configuration or grouping of playback devices in one or more zones and/or include preset volumes, equalizations, and/or other audio settings for each playback device. The immersive audio group setting may be saved and named by a user as a predetermined immersive audio group setting, and the immersive audio group setting may be selected by the user later for automatic grouping and configuration of playback devices and zones.

In one example, an immersive audio group setting may specify that the living room zone is grouped with the dining room zone, the balcony zone, the kitchen zone and the office zone where the living room zone contains the listener location for the current listening session and is a primary zone, and the dining room, balcony, kitchen, and office zones are auxiliary zones. The immersive audio setting may include volume settings and/or equalization settings such as specific volumes for the playback devices and/or specific equalization settings for the playback devices. The volume settings may be relative volume settings between the primary zone and the auxiliary zones and/or playback devices in the zones. For example, the relative volume settings may specify that playback devices in the auxiliary zone have a volume level that is a percentage, volume level amount, and/or decibel amount higher or lower than the volume level of the playback devices in the primary zone. In some aspects, the playback devices in the primary zone may have a group volume and individual playback device volumes, and the playback devices in the auxiliary zone may have a group volume and individual playback device volumes. The relative volume level may be based on the difference between the group volume of the zones. The user can input a custom name for the setting and/or the media playback system can suggest a name based, for example, on the name of the primary zone in the group. For example, the setting may be named, for example, "Living Room Immersive Audio."

Multiple settings may be stored in a device of the media playback system and may be associated with a user profile or user account on the media playback system. A computing device of the media playback system may show a user a list of stored immersive audio settings that are associated with the active user profile or user account, and the user can select a setting from the list. In response to the selection of the audio setting, the settings specified by the selected immersive audio setting may be automatically applied by the media playback system. In some instances, a stored immersive audio setting may be automatically applied based on, for example, the particular media or type of media (e.g., content with surround sound) being played in a zone categorized as an option for a primary zone.

An immersive audio setting may be implemented as a scene as described in U.S. patent application Ser. No. 11/853,790 filed on Sep. 11, 2007, titled "CONTROLLING AND MANIPULATING GROUPINGS IN A MULTI-ZONE MEDIA SYSTEM" and granted as U.S. Pat. No. 8,483,853 on Jul. 9, 2013, which is hereby incorporated by reference in its entirety. An immersive audio setting may be implemented as a multi-zone group scene as described in U.S. patent application Ser. No. 14/737,199, filed on Jun. 11, 2015, titled "MULTIPLE GROUPINGS IN A PLAYBACK SYSTEM", and published as U.S. Patent Application Publication No. 2016/0364206 on Dec. 15, 2016, which is hereby incorporated by reference in its entirety. In some aspects, the multi-zone group may include the primary zone and the at least one auxiliary zones used to play back immersive audio content.

The audio content may include channel information to map channels to different speaker configurations. The channel information can be in the form of particular metadata, encoding formats (e.g., codec), flags, and/or channel masks in the datastream. The channel information may include configuration information identifying speaker locations spatially for the audio and zone locations for the auxiliary audio. Speaker locations may include, for example, front left, front center, front right, rear left, rear right, side left, side right, etc. Other speaker locations are possible including ceiling or height specified speakers depending on the audio information. Zone location identifiers can be, for example, rear zone, right zone, left zone, front zone, lower zone, upper zone, etc. Other zone location identifiers are possible.

At block 512, the primary zone and the at least one auxiliary zone may be configured to play back immersive audio. In one example configuration, the primary zone may be configured to play back audio content identified as in-room audio, and the at least one auxiliary zone may be configured to play back audio content identified as auxiliary. The auxiliary content may specify particular areas or zones that should play the auxiliary audio based on a locational/spatial relationship between each auxiliary zone and the primary zone.

A playback device in the primary zone may be a group coordinator and cause the selected at least one auxiliary zone to be grouped with the primary zone for immersive audio playback. In some instances, the playback device in the primary zone may borrow individual playback devices from the at least one auxiliary zone. In other words, individual playback devices may be shared with other zones. For example, the playback device in the primary zone may add a playback device (e.g., subwoofer) for particular audio characteristics (e.g., frequency response range, location relative to listener location) as a new zone and/or temporarily (e.g., for the duration of immersive audio mode) add the playback device to the primary zone as an auxiliary playback device. Examples of sharable playback devices and dynamically grouping between zones are described in U.S. patent application Ser. No. 14/731,119, filed on Jun. 4, 2015, and titled "Dynamic Bonding of Playback Devices" which is published as U.S. Patent Application Publication 2016/0357503 on Dec. 8, 2016. This application is incorporated by reference in its entirety.

The group coordinator may process and send streams and/or channels to other devices for playback. For example, the group coordinator may be a master device that transmits processed surround sound audio to slave devices for playback along with timing information to enable slave devices to play back the surround sound audio synchronously with the master device. In some aspects, the group coordinator can send audio to auxiliary zone playback devices for playback. In yet other instances, the group coordinator may provide the auxiliary zone playback devices with an identifier of a network location where auxiliary audio can be obtained.

The auxiliary zone playback devices may receive immersive audio for playback in the form of audio blocks or samples which are portions of the immersive audio being played, and timing information may be provided with each audio sample. For example, a first audio sample may include a first timing information t1. Time t1 may indicate a time relative to a clock of the playback device when the first audio sample should be played. As another example, time t1 may be timing for playback of the first audio sample relative to playback time of the previous audio sample such as x time after playback of the previous audio sample. The timing information may include additional timing information corresponding to when an auxiliary zone should join for synchronous immersive audio playback. Other examples are possible.

In some aspects, the auxiliary zone may be dynamically grouped and ungrouped with the primary zone as the playback device(s) in the auxiliary zone are used for auxiliary audio playback. For example, the primary zone may send a message to the auxiliary zone shortly before the auxiliary zone (e.g., a predetermined period of time) is to play back audio to cause the auxiliary zone to group with the primary zone. The configuration may be maintained for the duration of playback of immersive audio. Once immersive audio playback has stopped or completed, the primary zone and at least one auxiliary zone may be automatically returned to its previous configuration state.

At block 512, the primary zone may play primary audio content and the at least one auxiliary zone may coordinate playback of auxiliary content with the primary audio content being played back by the primary zone based on timing information. For example, the at least one auxiliary zone may synchronously playback audio with the primary zone. As yet another example, the at least one auxiliary zone may be dynamically grouped with the primary zone. After immersive audio playback has been completed (e.g., primary zone leaves immersive audio mode, content changed to music playback), the primary zone and/or auxiliary zones may leave the immersive audio mode.

The features described herein may be performed with particular playback devices which might not be associated with a zone. These particular playback devices may be identified by an identifier (e.g., name, serial number, medium access control (MAC) address, model, model number, manufacturer, etc.) which may be specific or unique to the playback device.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method, comprising:
a network media system identifying a primary zone in the network media system to play back audio tracks of videos, wherein identifying the primary zone comprises determining that an input interface of a playback device within the primary zone is connected to (a) an output port of a display device or (b) an output port of a media player device that outputs audio and video;
the network media system determining respective audio responses of each of one or more auxiliary zones for coordinated playback of auxiliary audio content with the primary zone;
the network media system identifying at least one auxiliary zone of the one or more auxiliary zones for coordinated playback of auxiliary audio content based on the respective audio responses of each of the one or more auxiliary zones indicating that the at least one auxiliary zone is within audible range of the primary zone; and
while a multi-channel audio track of a given video is playing back, the network media system temporarily forming a playback configuration in which the primary zone plays back primary audio content comprising one or more first audio channels of the multi-channel audio track and the at least one auxiliary zone plays back auxiliary audio content comprising one or more second audio channels of the multi-channel audio track, wherein the primary zone and the at least one auxiliary zone are each configured to play back audio content individually before forming the playback configuration.

2. The method of claim 1, wherein the one or more first audio channels of the multi-channel audio track comprise a center channel audio track and wherein the one or more second audio channels comprise one or more surround audio tracks.

3. The method of claim 1, wherein the one or more first audio channels of the multi-channel audio track comprise a dialogue audio track and wherein the one or more second audio channels comprise one or more non-dialogue audio tracks.

4. The method of claim 1, wherein temporarily forming the playback configuration comprises temporarily forming a bonded zone that includes playback devices of the primary zone and the at least one auxiliary zone, and wherein the method further comprises re-forming the primary zone and the at least one auxiliary zone when the multi-channel audio track of the given video stops playing back.

5. The method of claim 1, wherein identifying the primary zone comprises:
  determining types of playback devices in the network media system; and
  identifying a zone comprising a playback device corresponding to a first type as the primary zone, wherein the first type corresponds to one of (a) a sound bar-type playback device or (b) a sound base-type playback device.

6. The method of claim 1, wherein determining respective audio responses comprises:
  causing a first auxiliary zone to play calibration audio; and
  capturing, via a microphone in a listener location of the primary zone, the calibration audio played by the first auxiliary zone.

7. The method of claim 1, wherein the multi-channel audio track comprises surround sound audio content of the given video.

8. A tangible, non-transitory computer-readable medium storing instructions that when executed by at least one processor cause a network media system to perform functions comprising:
  identifying a primary zone in the network media system to play back audio tracks of videos, wherein identifying the primary zone comprises determining that an input interface of a playback device within the primary zone is connected to (a) an output port of a display device or (b) an output port of a media player device that outputs audio and video;
  determining respective audio responses of each of one or more auxiliary zones for coordinated playback of auxiliary audio content with the primary zone;
  identifying at least one auxiliary zone of the one or more auxiliary zones for coordinated playback of auxiliary audio content based on the respective audio responses of each of the one or more auxiliary zones indicating that the at least one auxiliary zone is within audible range of the primary zone; and
  while a multi-channel audio track of a given video is playing back, the network media system temporarily forming a playback configuration in which the primary zone plays back primary audio content comprising one or more first audio channels of the multi-channel audio track and the at least one auxiliary zone plays back auxiliary audio content comprising one or more second audio channels of the multi-channel audio track, wherein the primary zone and the at least one auxiliary zone are each configured to play back audio content individually before forming the playback configuration.

9. The computer-readable medium of claim 8, wherein the one or more first audio channels of the multi-channel audio track comprise a center channel audio track and wherein the one or more second audio channels comprise one or more surround audio tracks.

10. The computer-readable medium of claim 9, wherein the one or more first audio channels of the multi-channel audio track comprise a dialogue audio track and wherein the one or more second audio channels comprise one or more non-dialogue audio tracks.

11. The computer-readable medium of claim 8, wherein temporarily forming the playback configuration comprises temporarily forming a bonded zone that includes playback devices of the primary zone and the at least one auxiliary zone, and wherein the functions further comprise re-forming the primary zone and the at least one auxiliary zone when the multi-channel audio track of the given video stops playing back.

12. The computer-readable medium of claim 8, wherein identifying the primary zone comprises:
  determining types of playback devices in the network media system; and
  identifying a zone comprising a playback device corresponding to a first type as the primary zone, wherein the first type corresponds to one of (a) a sound bar-type playback device or (b) a sound base-type playback device.

13. The computer-readable medium of claim 8, wherein determining respective audio responses comprises:
  causing a first auxiliary zone to play calibration audio; and
  capturing, via a microphone in a listener location of the primary zone, the calibration audio played by the first auxiliary zone.

14. The computer-readable medium of claim 8, wherein the multi-channel audio track comprises surround sound audio content of the given video.

15. A computing device of a network media system comprising:
  at least one processor; and
  memory storing instructions that when executed by the at least one processor cause the computing device to perform functions comprising:
    identifying a primary zone in the network media system to play back audio tracks of videos, wherein identifying the primary zone comprises determining that an input interface of a playback device within the primary zone is connected to (a) an output port of a display device or (b) an output port of a media player device that outputs audio and video;
    determining respective audio responses of each of one or more auxiliary zones for coordinated playback of auxiliary audio content with the primary zone;
    identifying at least one auxiliary zone of the one or more auxiliary zones for coordinated playback of auxiliary audio content based on the respective audio responses of each of the one or more auxiliary zones indicating that the at least one auxiliary zone is within audible range of the primary zone; and
    while a multi-channel audio track of a given video is playing back, the network media system temporarily forming a playback configuration in which the primary zone plays back primary audio content comprising one or more first audio channels of the multi-channel audio track and the at least one auxiliary zone plays back auxiliary audio content comprising one or more second audio channels of the multi-channel audio track, wherein the primary zone and the at least one auxiliary zone are each configured to play back audio content individually before forming the playback configuration.

16. The computing device of claim 15, wherein the one or more first audio channels of the multi-channel audio track comprise a center channel audio track and wherein the one or more second audio channels comprise one or more surround audio tracks.

17. The computing device of claim 15, wherein the one or more first audio channels of the multi-channel audio track comprise a dialogue audio track and wherein the one or more second audio channels comprise one or more non-dialogue audio tracks.

18. The computing device of claim 15, wherein temporarily forming the playback configuration comprises temporarily forming a bonded zone that includes playback devices of the primary zone and the at least one auxiliary zone, and wherein the functions further comprise re-forming the primary zone and the at least one auxiliary zone when the multi-channel audio track of the given video stops playing back.

19. The computing device of claim 15, wherein identifying the primary zone comprises:
   determining types of playback devices in the network media system; and
   identifying a zone comprising a playback device corresponding to a first type as the primary zone, wherein the first type corresponds to one of (a) a sound bar-type playback device or (b) a sound base-type playback device.

20. The computing device of claim 15, wherein determining respective audio responses comprises:
   causing a first auxiliary zone to play calibration audio; and
   capturing, via a microphone in a listener location of the primary zone, the calibration audio played by the first auxiliary zone.

\* \* \* \* \*